United States Patent
Wang et al.

(10) Patent No.: US 9,854,639 B1
(45) Date of Patent: Dec. 26, 2017

(54) POWER SUPPLY CIRCUIT FOR LED LIGHTING

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Qiming Wang, Zhejiang (CN); Guanghua Wu, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/624,310

(22) Filed: Jun. 15, 2017

(30) Foreign Application Priority Data

Jun. 22, 2016 (CN) .......................... 2016 1 0454742

(51) Int. Cl.
*H05B 33/08* (2006.01)

(52) U.S. Cl.
CPC ....... *H05B 33/089* (2013.01); *H05B 33/0842* (2013.01)

(58) Field of Classification Search
CPC ............ H05B 33/0815; H05B 33/0818; H05B 33/0884; H05B 33/089; H05B 33/0848; H05B 33/0842; H05B 33/0896
USPC ........ 315/294, 297, 307, 122, 192, 224, 127
See application file for complete search history.

(56) References Cited

U.S. PATENT DOCUMENTS

| | | | | |
|---|---|---|---|---|
| 4,780,788 A | * | 10/1988 | Kammerer | H02H 3/087 361/18 |
| 2004/0095108 A1 | * | 5/2004 | Kernahan | H03K 19/0963 323/282 |
| 2004/0135560 A1 | * | 7/2004 | Kernahan | H02M 3/157 323/282 |
| 2010/0176776 A1 | * | 7/2010 | Wachi | H02M 1/08 323/282 |
| 2010/0201283 A1 | * | 8/2010 | Kawata | G05F 3/08 315/287 |
| 2016/0081171 A1 | * | 3/2016 | Ichikawa | B60Q 1/0088 315/77 |
| 2017/0034887 A1 | * | 2/2017 | Ichikawa | B60Q 1/04 |
| 2017/0188420 A1 | * | 6/2017 | Kido | H05B 33/089 |

* cited by examiner

*Primary Examiner* — Douglas W Owens
*Assistant Examiner* — Syed M Kaiser
(74) *Attorney, Agent, or Firm* — Wang Law Firm, Inc.

(57) ABSTRACT

An angle adjustment mechanism for LED bar lighting includes a lamp body, two end covers arranged two ends of the lamp body along an axial direction thereof, two lamp frames respectively mounted on the two threading pipes, two wheel gears respectively fixed on the two lamp frames, two outer end caps fixed and covered on the two end covers, respectively, and at least two stopping plates respectively received in the two lamp frames. Each of the two end covers includes a threading pipe extending along the axial direction of the lamp body. Each of the two wheel gears includes a plurality of gear teeth taken along a radial direction thereof and rotating around the threading pipe. Each of the stopping plates provides at least one stopping tooth which is coupling to the gear teeth.

9 Claims, 2 Drawing Sheets

POWER SUPPLY CIRCUIT FOR LED LIGHTING

RELATED APPLICATION

This present application claims benefit of the Chinese Application, CN201610454742.0, filed on Jun. 22, 2016.

BACKGROUND

1. Technical Field

The present application relates to a lighting power supply device, and more particularly to a power supply circuit for LED lighting.

2. Description of the Related Art

Light emitting diode (LED) is growing in popularity due to decreasing costs and long life compared to incandescent lighting and fluorescent lighting. Recently, a number of LED lighting apparatuses have been designed to replace the halogen apparatus, as well as other traditional incandescent or fluorescence lighting apparatuses. In some places such as exhibition halls, jewelry stores, museums, supermarkets, and some home lighting, such as large villas, will use a lot of strip LED lamps. Moreover, in addition to lighting equipments, such as general traffic lights, billboards, motor-lights, etc., also use light-emitting diodes as light source. As described above, for the light-emitting diodes as a light source, the advantage is power saving, and the greater brightness. Therefore, the use has been gradually common.

As well known, power supply, which affects the life of LED lamps, as one of the most important factors, is also the object of concern. General LED power supply has output short protection circuit. The output short protection circuit may means that the power supply outputs very low system input power or low frequency power when the short circuit occurs. And after the withdrawal of the short circuit, the power supply can automatically return to normal work. However, with the increase of energy-saving awareness and light distribution requirements, a current-sensitive components, such as MOS tube, may be electrically connected in series between the power outputs and the LED lamp load. Therefore, when the LED light load is in short circuit, the output circuit must output a large impact current, and the impact current in the moment will reach tens to hundreds of amps. The impact current is often far more than the ultimate tolerance of the current-sensitive components. As a result, these current-sensitive components will be breakdown and the power supply fails.

Therefore, it is necessary to provide a power supply circuit for LED lighting having short circuit protection which makes it possible to prevent the power supply from failing.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
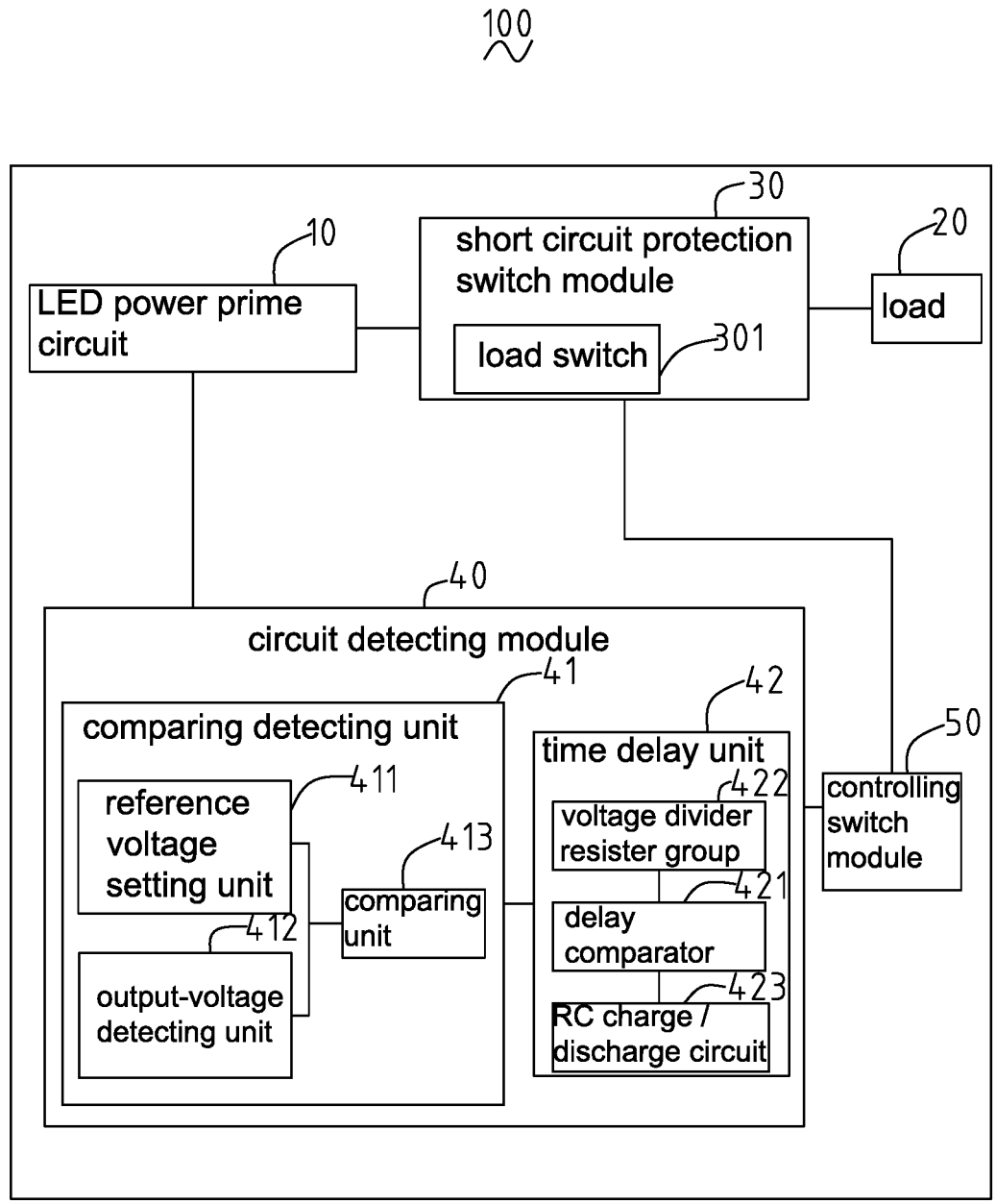
FIG. 1 is a block diagram of a power supply circuit for LED lighting according to an embodiment.
Figure 2:
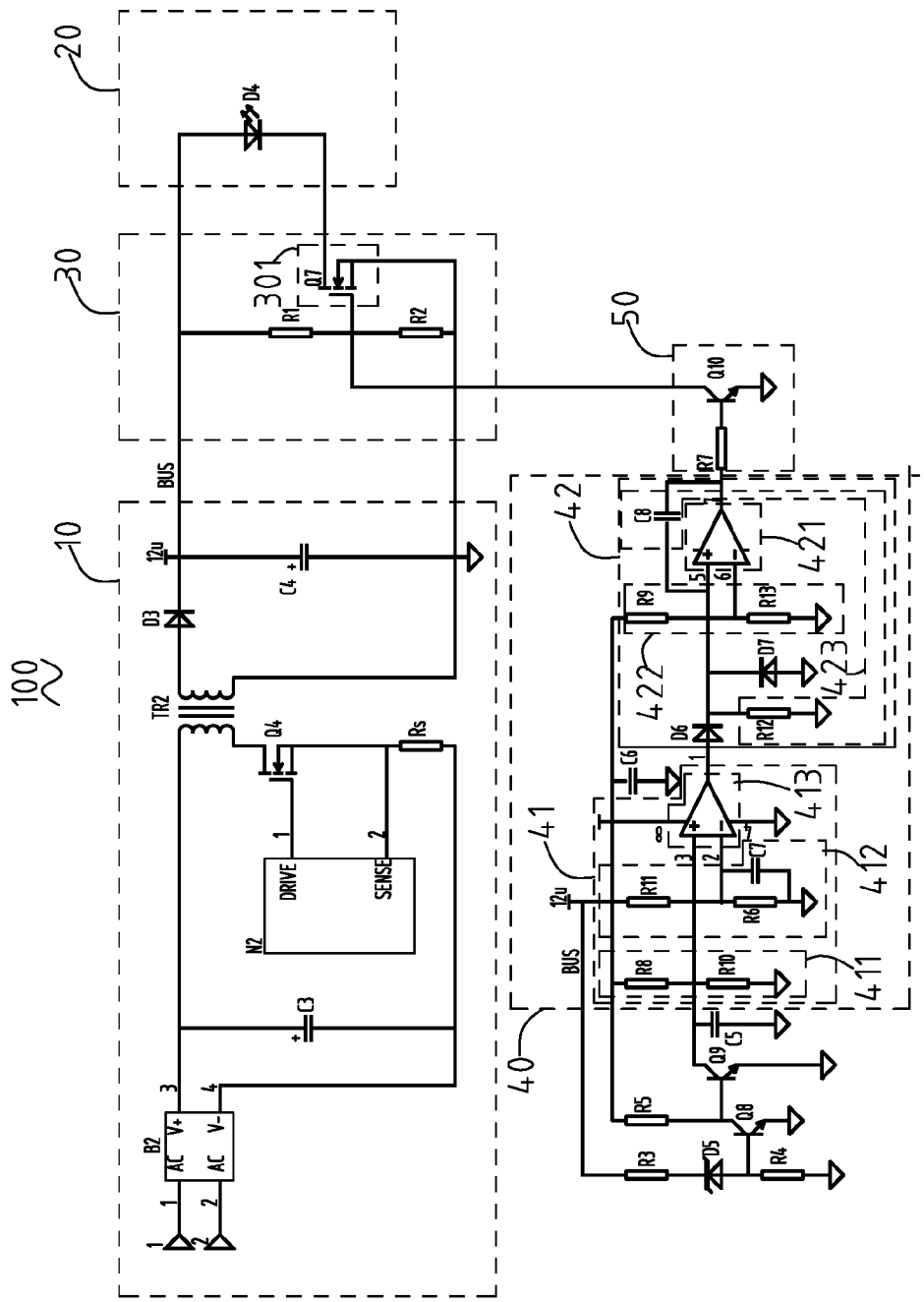
FIG. 2 is a circuit diagram of the power supply circuit for LED lighting of FIG. 1.

Referring to FIG. 1 to FIG. 2, a power supply circuit 100 for LED lighting is shown. The power supply circuit 100 for LED lighting includes an LED power prime circuit 10, a load 20 electrically connected to the output ends of the LED power prime circuit 10, a short circuit protection switch module 30 electrically connected between the LED power prime circuit 10 and the load 20, a circuit detecting module 40, and a controlling switch module 50 configured for controlling the short circuit protection switch module 30 to be turn on or turn off according to a detecting signal from the circuit detecting module 40. It may be understood that the power supply circuit for LED lighting further includes other function modules, such as cooling module, discharge control module, or the like, which is well known by these persons skilled in the art and not described in detail.

The LED power prime circuit 10 is an ordinary power supply circuit which is configured for transforming the mains to a current suitable for using in the load 20, such as frequency, amplitude, size, or the like. The output voltage of the LED power prime circuit 10 should be a rated voltage of the load 20 of subsequent stage, and the load 20 may be LED lamps, and the normal voltage thereof may be 30V or 24V. As for the specific circuit configuration within the LED power prime circuit 10, it is not the focus of the present invention and not described in detail.

The load 20 may be one or plurality of LED lightings, which may be electrically connected in parallel or in series and will not be described here. The load 20 is electrically connected to the output ends of the LED power prime circuit 10 and is powered thereby. In general use, since the load 20 is constituted of a number of LED chips, such as LED bar lights, LED strips, COB LED chips, which includes a number of LED chips, it is difficult to ensure that each of the LED chips have same life, or one or more of the LED chips is not damaged in use. Once one or more of the LED chips are damaged, which will cause a short circuit. Therefore, in order to protect other LED chips, and the LED power supply, the general LED power supply are set up short circuit protection to achieve this goal.

The short circuit protection switch module 30 is electrically connected between the load 20 and the LED power prime circuit 10, and configured for turning off the LED power prime circuit 10 in time when the load 20 is short-circuited. That is to say, the LED power supply circuit 10 is turned off and stops supplying power to the load 20 so as to avoid damaging the load 20 or damaging the LED power supply circuit 10 due to an excessive output current. Thus, the short circuit protection switch module 30 includes a load switch 301 for turning off the power input. Referring to FIG. 2, the short circuit protection switch module 30 includes two resisters R1, R2 in series, and an N-channel MOS Q7 electrically connected in parallel to the resister R2. The resisters R1, R2 are configured for providing a suitable turn-on voltage for the MOS Q7 by a partial voltage as characteristics of MOS tube as the conduction voltage of the MOS tube cannot be too high and it will burn. The N-channel MOS Q7 is the load switch 301 described above. Of course, it may be understood that the P-channel MOS tube, or other switchers can be used in the short circuit protection switch module 30 by changing the circuit design. A gate of the N-channel MOS Q7 is electrically connected to the controlling switch module 50 and the resisters R1, R2, and a source thereof is grounded, and a drain thereof is electrically connected to an input of the load 20. Another input terminal of the load 20 is electrically connected to the output terminal of the LED power prime circuit 10. It is of course understood that when the power supply circuit 100 for LED lighting has a color-temperature adjustment signal or a dimming signal, these signal may be a PWM signal, the color-temperature adjustment signal or the dimming signal as well known is also connected to the gate of the N-channel MOS Q7 so as to achieve the purpose of adjusting the output by controlling the time ration of the ON/OFF of the N-channel MOS Q7.

The circuit detecting module 40 is used to detect whether or not the load 20 has a short circuit condition. When the load 20 has no the short circuit condition, the circuit detecting module 40 outputs a controlling signal for controlling the control switch module 50 not to operate the load switch 301 by detecting the output control signal of the LED power prime circuit 10. When the load 20 is short-circuited, the circuit detecting module 40 outputs a controlling signal for controlling the control switch module 50 to turn off the load switch 301 so as to turn off the whole circuit. The circuit detecting module 40 is configured for detecting the change of the output voltage of the LED power prime circuit 10. When the load 20 is short-circuited, the output voltage of the LED power prime circuit 10 will be immediately decreased. Therefore, when the output voltage of the LED power prime circuit 10 is decreased, the circuit detecting module 40 can detect the drop of the output voltage and outputs the controlling signal right now. In the present embodiment, when the input voltage of the circuit detecting module 40 is less than 88% of the normal voltage at the output terminal of the LED power prime circuit 10, the circuit detecting module 40 will output the controlling signal so as to turn off the load switch 301. It can be understood that the size of the ratio may be adjusted by setting the parameter of the electronic component of the circuit detecting module 40. For example, when the input voltage of the circuit detecting module 40 is less than such as 90% or 95%, it will output the controlling signal. The circuit detecting module 40 includes a comparing detecting unit 41 and a time delay unit 42. The comparing detecting unit 41 is configured for comparing the output voltage of the LED power prime circuit 10 with a predetermined reference voltage and outputs a control signal. The comparing detecting unit 41 includes a reference voltage setting unit 411, an output-voltage detecting unit 412, and a comparing unit 413. The comparing unit 413 may include an amplifier and the non-inverting input terminal of the amplifier is electrically connected to the output terminal of the reference voltage setting unit 411, the inverting input terminal thereof is electrically connected to the output terminal of the output-voltage detecting unit 412. The reference voltage setting unit 411 includes two resisters R6 and R10 electrically connected in series between the output terminal of the LED power prime circuit 10 and ground. The preset reference voltage of the reference voltage setting unit 411 can be set by setting the parameter of the two resistors R6 and R10. The output-voltage detecting unit 412 is arranged in parallel with the reference voltage setting unit 411 and includes two resisters R11, R14 electrically connected in series between the output terminal of the LED power prime circuit 10 and ground, and capacitor C7 electrically connected in parallel with one of the two resisters R11, R14. In the circuit detecting module 40, the output-voltage detecting unit 412 is configured for detecting the change of the output voltage of the LED power prime circuit 10. In the present embodiment, when the output voltage of the output-voltage detecting unit 412 is less than 88% of the normal voltage of the output terminals of the LED power prime circuit 10, the comparing unit 413 will output high level so as to drive the control switch module 50 to turn off the load switch 301. The comparing unit 413 is a common electronic component, and in the present embodiment, the comparing unit 413 is a voltage comparator which determines that the output voltage thereof is a low level or a high level by comparing the input voltage of the non-inverting input terminal and the inverting input terminal. In the present embodiment, when the load 20 is normal condition, the output voltage of the LED power prime circuit 10 and the output voltage of the output-voltage detecting unit 412 is larger than the reference voltage set by the reference voltage setting unit 411 and the output voltage of the comparing unit 43 is high level. However, when short circuit occurs in the load 20, the output voltage of the LED power prime circuit 10 is immediately lowered and when the output voltage of the LED power prime circuit 10 is smaller than 88% of the normal output voltage, the output voltage of the output-voltage detecting unit 412 will be smaller than the reference voltage, and the output voltage of the comparing unit 43 is low level.

The time delay unit 42 is configured for extending the time period in that the low level signal reaches the control switch module 50 so as to achieve the purpose of effectively turning off the load switch 301 when the output voltage of the comparing detecting unit 42 is low level. If the time period has not been extended, when the output voltage of the LED power prime circuit 10 is lowered without the delay of the time delay unit 42, the load switch 301 is turned off right now and the output voltage of the LED power prime circuit 10 returns to the normal level, almost at the same time the load switch 301 will be turned on. As a result, the load switch 301 will be turned on or turned off at a very high frequency under the control of the comparing detecting unit 41. Therefore, the load switch 301 will be burnt, particularly when the load switch 301 is a MOS tube. When the time delay unit 42 extends the low level signal to the control switch module 50 for 1 second, the N-channel MOS Q7 has sufficient turn-off time to dissipate heat without burning. The time delay unit 42 includes a delay comparator 421, a voltage divider resister group 422, and an RC charge/discharge circuit 423. The output terminal of the comparing detecting unit 41 is electrically connected to the inverting input end of the delay comparator 421 and the non-inverting input end of the delay comparator 421 is electrically connected to the output terminal of the voltage divider resister group 422. The RC charge/discharge circuit 423 includes a capacitor C8 electrically connected between the inverting input end of the delay comparator 421 and the output terminal of the delay comparator 421, and a resister R12 electrically connected between the output terminal of the comparing detecting unit 41 and ground. When the output voltage of the comparing detecting unit 41 is high level, the voltage of the non-inverting input end of the delay comparator 421 is higher than that of the inverting input end and the output voltage of the delay comparator 421 is high level and the capacitor C8 will be charged. When the output of comparing detecting unit 41 is low level, the voltage of the inverting input end of the delay comparator 421 is lower than that of the non-inverting input end and the output of the delay comparator 421 and the capacitor C8 will be discharged so as to prevent the immediate output of the low level signal of the time delay unit 42. However, when the discharge of the capacitor C8 is finished, the time delay unit 42 outputs the low level signal, thereby achieving the purpose of delay.

The control switch module 50 may include an NPN-typed triode Q10. It can be understood that other types of electronic components or circuit may be used as the control switch module 50, as long as it can be turned on when the time delay unit 42 outputs low level and can be turned off when it outputs high level. A base of the NPN-typed triode Q10 is electrically connected to the output terminal of the time delay unit 42, A collector is electrically connected to the load switch 301, and A emitter grounds. When the time delay unit 42 outputs low level, the NPN-typed triode Q10 turns on ground, the load switch 301, i.e., the gate of the MOS transistor Q7, is low level so that the MOS transistor Q7 is turned off to achieve the purpose of turning off the load switch 301. However, when the time delay unit outputs high level, the NPN-typed triode Q10 turns off, and the gate of the MOS Q7 is high level and turns on.

The power supply circuit 100 for LED lighting protects the short circuit protection switch module 30 by the comparing detecting unit 41 and the time delay unit 42 so as to turn off the whole circuit when short circuit occurs in the load 20. Moreover, the power supply circuit 100 for LED lighting protects the load switch 301 of the short circuit protection switch module 30 from burning so as to avoid the whole circuit from failing.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply circuit for LED lighting, comprising:
   an LED power prime circuit (10);
   a load (20) electrically connected to output terminals of the LED power prime circuit (10);
   a short circuit protection switch module (30) electrically connected between the LED power prime circuit (10) and the load (20), the short circuit protection switch module (30) comprising a load switch (301) configured for turning on or turning off the load (20);
   a circuit detecting module (40) electrically connected to the short circuit protection switch module (30), the circuit detecting module (40) comprising a comparing detecting unit (41), and a time delay unit (42), the comparing detecting unit (41) comparing the output voltage of the LED power prime circuit (10) and a predetermined reference voltage and outputting a controlling signal according to the comparison result, the time delay unit (42) outputting a switch control signal after a delay time for a predetermined time in accordance with a control signal of the comparing detecting unit (41); and
   a controlling switch module (50) configured for turning on or turning off the load switch (301) in accordance with the switch control signal outputted by the time delay unit (42) so as to turn on or turn off the power supply for the load (20).

2. The power supply circuit for LED lighting as claimed in claim 1, wherein the load switch (301) comprises a N-channel MOS, a gate of the N-channel MOS is electrically connected to the controlling switch module (50).

3. The power supply circuit for LED lighting as claimed in claim 1, wherein the short circuit protection switch module (30) comprises two resisters electrically connected in series between the output terminals of the LED power prime circuit (10).

4. The power supply circuit for LED lighting as claimed in claim 1, wherein the comparing detecting unit (41) comprises a reference voltage setting unit (411), an output-voltage detecting unit (412), and a comparing unit (413), a non-inverting input end of the comparing unit (413) is electrically connected to the output terminal of the reference voltage setting unit (411), an inverting input end of the comparing unit (413) is electrically connected to the output terminal of the output-voltage detecting unit (412).

5. The power supply circuit for LED lighting as claimed in claim 4, wherein the reference voltage setting unit (411) comprises two resisters electrically connected in series between the output terminal of the LED power and ground.

6. The power supply circuit for LED lighting as claimed in claim 4, wherein the output-voltage detecting unit (412) is connected in series to the reference voltage setting unit (411) and comprises two resisters electrically connected in series between the LED power prime circuit (10) and ground, and a capacitor electrically connected in parallel to one of the two resisters.

7. The power supply circuit for LED lighting as claimed in claim 1, wherein when the output voltage of the output-voltage detecting unit (412) is less than 88% of the normal voltage of the output terminals of the LED power prime circuit (10).

8. The power supply circuit for LED lighting as claimed in claim 7, wherein the time delay unit (42) comprises a delay comparator (421), a voltage divider resister group (422), and a RC charge/discharge circuit (423), the output terminal of the comparing detecting unit (41) is electrically connected to a non-inverting input end of the delay comparator (421), an inverting input end of the comparing detecting unit (41) is electrically connected to the output terminal of the voltage divider resister group, the RC charge/discharge circuit (423) comprises a capacitor electrically connected between the non-inverting input end and the output terminal of the delay comparator (421), and a resister electrically connected between the output terminal of the comparing detecting unit (41) and ground.

9. The power supply circuit for LED lighting as claimed in claim 1, wherein the controlling switch module (50) comprises a NPN-typed triode, a base of the NPN-typed triode is electrically connected to the output terminal of the time delay unit (42), a collector is electrically connected to the load switch (301), and an emitter grounds.

* * * * *